(12) United States Patent
Blackard

(10) Patent No.: US 10,983,873 B1
(45) Date of Patent: Apr. 20, 2021

(54) PRIORITIZING ELECTRONIC BACKUP

(71) Applicant: Amazon Technologies, Inc., Seattle, WA (US)

(72) Inventor: Andrew G. Blackard, Lynnwood, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 252 days.

(21) Appl. No.: 15/717,510

(22) Filed: Sep. 27, 2017

(51) Int. Cl.
*G06F 11/14* (2006.01)
*G06F 16/17* (2019.01)

(52) U.S. Cl.
CPC ...... *G06F 11/1464* (2013.01); *G06F 16/1734* (2019.01); *G06F 2201/80* (2013.01)

(58) Field of Classification Search
CPC ............ G06F 11/1461; G06F 11/1448; G06F 11/1451; G06F 11/1458; G06F 11/1464; G06F 11/1469
See application file for complete search history.

(56) References Cited

U.S. PATENT DOCUMENTS

| | | | |
|---|---|---|---|
| 6,415,300 B1 * | 7/2002 | Liu | G06F 11/1458 707/652 |
| 6,865,655 B1 * | 3/2005 | Andersen | G06F 11/1453 707/999.202 |
| 2002/0040273 A1 * | 4/2002 | John | G06Q 10/10 702/5 |
| 2003/0177324 A1 * | 9/2003 | Timpanaro-Perrotta | G06F 11/1448 711/162 |
| 2005/0187889 A1 * | 8/2005 | Yasoshima | G06F 16/16 |
| 2008/0294703 A1 * | 11/2008 | Craft | G06F 16/10 |
| 2011/0276823 A1 * | 11/2011 | Ueno | G06F 11/1458 714/4.11 |
| 2012/0102088 A1 * | 4/2012 | Bindal | G06F 11/1461 709/203 |
| 2013/0024425 A1 * | 1/2013 | Huang | G06F 16/16 707/650 |
| 2016/0019119 A1 * | 1/2016 | Gupta | G06F 11/1451 707/654 |
| 2016/0308950 A1 * | 10/2016 | Bouvrette | G06F 16/13 |
| 2016/0335283 A1 * | 11/2016 | Rabinovich | G06F 11/1448 |
| 2017/0228391 A1 * | 8/2017 | Savla | G06F 12/0871 |

\* cited by examiner

*Primary Examiner* — Cheyne D Ly
(74) *Attorney, Agent, or Firm* — Hogan Lovells US LLP

(57) ABSTRACT

A technology is described for prioritizing electronic files for backup to a backup storage. An example method may include determining a defined file value of an electronic file identified for backup to a backup storage. A backup priority may be assigned to the electronic file based in part on the defined file value of the electronic file, and a backup entry for the electronic file may be added to a backup queue. Thereafter, the backup entry for the electronic file may be retrieved from the backup queue, wherein the backup priority for the electronic file may be higher as compared to backup priorities of other electronic files represented by backup entries in the backup queue, and a copy of the electronic file represented by the backup entry in the backup queue may be sent to the backup storage.

20 Claims, 8 Drawing Sheets

PRIORITIZING ELECTRONIC BACKUP

BACKGROUND

Many companies and individuals face the challenge of how to best protect important data from loss. End user computing devices and the data stored on the computing device may be at risk due to hardware failures, loss, theft, accidental deletion, and malicious entities. End users understand these risks and in the absence of a solution, end users may take the initiative to backup important electronic files. For example, end users may manually copy important electronic files to a backup storage or utilize a backup tool. Some end users may utilize a remote managed backup service, sometimes referred to as backup-as-a-service, to provide a system for the backup, storage, and recovery of electronic files. Centralized backup systems can include a client application that executes according to a schedule, such as once a day, at night while a computing device is not being used, or a client application may continuously monitor electronic files for changes. A backup system may collect and transfer electronic files to a data repository located on one or more remote servers.

DETAILED DESCRIPTION

Figure 1:
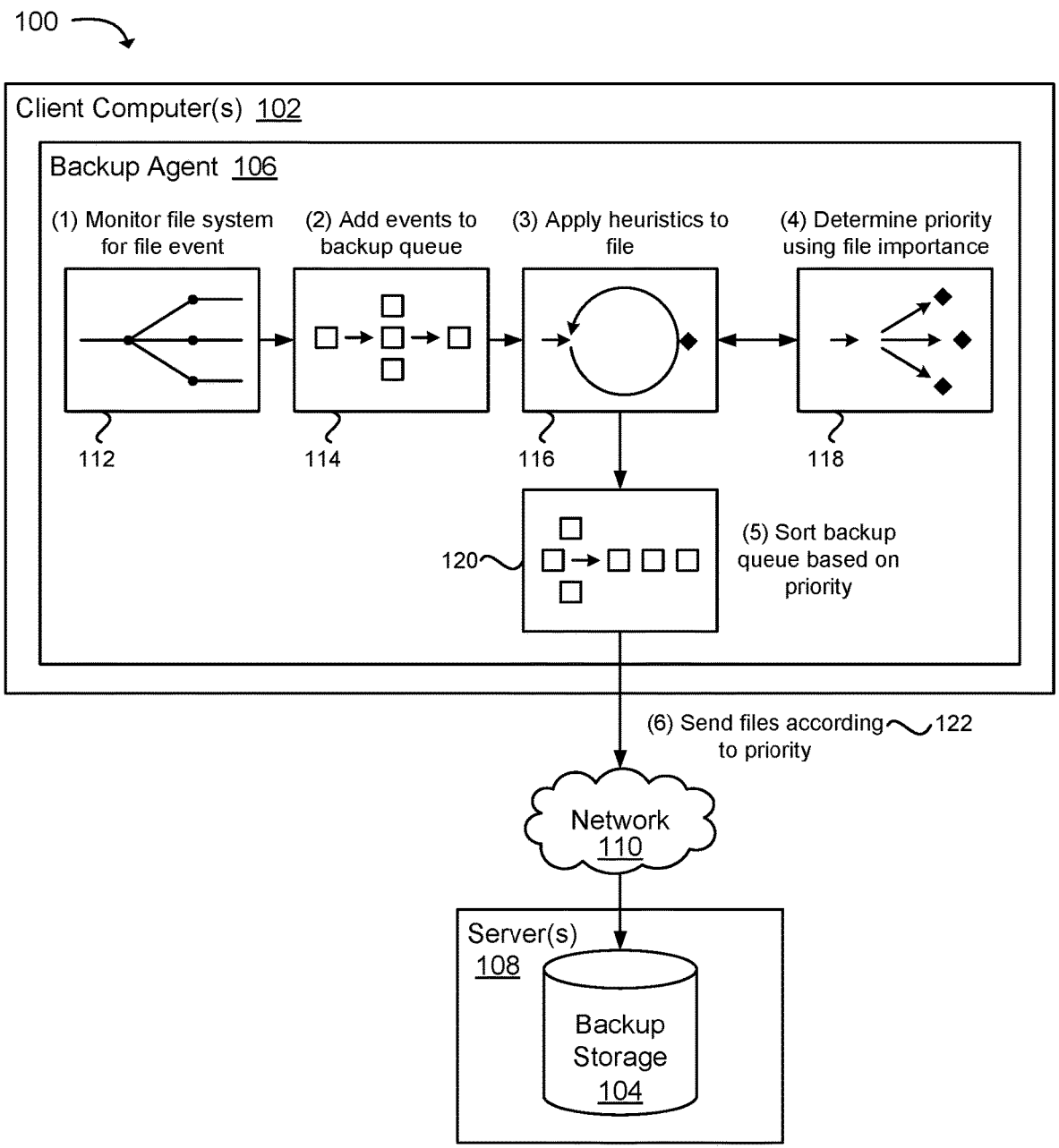
FIG. 1 is a block diagram illustrating an example system and method for prioritizing electronic files for backup to a backup data store.

A technology is described for prioritizing electronic files on a client device for backup to a backup storage located in a centralized location or in a service provider environment. An electronic file may be an electronic object encapsulating data, including information, settings, commands, and other organized data capable of being stored to a data store. Electronic files stored on a computer may be prioritized for backup based in part on a defined value or expected value of an electronic file to a user. As an example, electronic files associated with an amount of work invested by a user may be prioritized for backup over electronic files that receive little or no work investment from a user. For example, users may invest a significant amount of work into word processing documents, spreadsheet documents, presentation documents, source code files, graphic files, as well as other types of files that may be associated with a user work product. These types of electronic files may be more valuable to a user as compared to other types of electronic files stored on a client computer due to an amount of work the user has invested into the electronic files. As such, electronic files determined to be valuable to a user may be backed up to a backup storage before backing up electronic files determined to be less valuable to the user.

The value of an electronic file to a user may be determined by analyzing file properties and user interaction behavior with the electronic file using heuristic definitions or rules to derive a defined file value of the electronic file to the user. The defined file value may then be used to assign a backup priority (e.g., a number, percentage, rank, score, weight, position, etc.) to the electronic file. In one example, a file type, a file directory, and/or an activity history for an electronic file may be used to determine a defined file value for an electronic file and the defined file value may be used to assign a backup priority to the electronic file. A backup priority assigned to an electronic file may determine an order in which the electronic file is replicated and sent to a backup storage (e.g., a remote backup appliance, an integrated backup appliance, a virtual backup server, a managed storage service, etc.). Electronic files assigned higher backup priorities may be prioritized over electronic files assigned lower backup priorities, resulting in backing up the higher priority electronic files before backing up the lower priority electronic files.

In one example, a backup queue may be used to process electronic files for backup to a backup storage. The backup queue may be sorted using backup priorities assigned to electronic files. As an example, an electronic file may be identified for backup to a backup data store, and a backup priority may be assigned to the electronic file. A file identifier (and optionally a backup priority) for the electronic file may be added to the backup queue, causing the backup queue to be sorted using backup priorities assigned to electronic files represented in the backup queue. For example, anytime that an electronic file (e.g., a file identifier or backup entry) is added to the backup queue, the backup queue may be re-sorted using the backup priorities assigned to the electronic files. The electronic files may be replicated and stored to a backup storage in an order determined by the backup queue.

To further describe the present technology, examples are now provided with reference to the figures. FIG. 1 is a diagram illustrating a high level example of a system 100 and method for prioritizing electronic files for backup to a backup storage 104. The system 100 may include a client computer 102 configured with a backup agent 106 and a server 108 which hosts the backup storage 104. The backup agent 106 may include software (e.g., an application, program, daemon, script, service, etc.) installed on a client computer 102 and the backup agent 106 may be configured to prioritize electronic files stored on the client computer 102 according to a defined file value and send copies of the electronic files to a backup storage 104 in an order determined by the priority assigned to the electronic files.

In one example, the backup agent 106 may be configured to monitor a file system for file events 112 associated with changes to the file system that indicate that an electronic file has been added to the file system, or that an electronic file included in the file system has been modified, so that an electronic file associated with a change to the file system may be backed up to a backup storage 104 for safekeeping (i.e., replicated and stored to the backup storage 104). As an example, the backup agent 106 may monitor the file system for changes and generate a backup entry (e.g., a data object) when the file system undergoes a change, such as the addition of an electronic file to the file system or a modification of an electronic file managed using the file system. A backup entry generated by the backup agent 106 may include metadata for an electronic file (e.g., a file identifier, file extension, file creation date, file modification date, etc.), which can be used to prioritize the electronic file for backup.

Backup entries generated by the backup agent 106 may be added to a backup queue 114. In one example, a backup entry may be used to represent an electronic file added to the backup queue. The backup entry may include electronic file information (e.g., a file identifier, a file path, and a backup priority). The backup queue may be used to determine an order in which electronic files represented in the backup queue are replicated, transferred, and stored to the backup storage 104. The backup queue can be implemented using any data structure capable of being sorted (e.g., queues, trees, lists, arrays, graphs, etc.). For example, a priority queue data structure may be used to implement the backup queue. The backup queue may be sorted based in part on backup priorities assigned to electronic files represented in the backup queue.

An electronic file may be prioritized based in part on a defined file value of an electronic file linked to a backup entry generated by the backup agent 106. The defined file value may represent the value of the electronic file to a user or the system. For example, some electronic files stored on a client computer 102 may be more valuable to a user as compared to other electronic files stored on the client computer 102. For instance, an electronic file may be important to a user due to an amount of work that has been invested into the electronic file by the user, or some types of electronic files may be more valuable to a user as compared to other types of electronic files. A defined file value of an electronic file may be determined and the defined file value may be used as a priority indicator to assign a backup priority to the electronic file. The defined file value may be represented using a binary value (e.g., valuable or not valuable), a level of importance (e.g., low, medium, or high), a score, a weight, as well as any other quantitative method that may be used to represent a file value.

In one example, the backup agent 106 may be configured to determine a defined file value of an electronic file by applying heuristics to file characteristics of the electronic file 116. For example, the backup agent 106 may apply heuristics to a file type or other file properties of an electronic file, a file directory containing the electronic file, and/or an activity history for the electronic file. The backup agent 106 may use the results to determine a defined file value of the electronic file. For example, the backup agent 106 may use the result of applying a heuristic to a file characteristic to calculate a defined file value for an electronic file.

Accordingly, as one example, a defined file value may be based in part on a file type of an electronic file. File types may be categorized or ranked as being important or not important to a user. For example, some file types may be considered more valuable to a user as compared to other file types. As an example, word processing documents, spreadsheet documents, presentation documents, source code files, graphic files, and other file types associated with a user work product may be more valuable to a user as compared to log files, configuration files, executable files and other file types that may not be generally associated with a user work product. As such, file types may be categorized or ranked based on a generally accepted value of the file types to users. As a non-limiting example, word processing documents may be categorized as being valuable to users based on a general acceptance that word processing documents are associated with an amount of work invested by a user, whereas system log files may be categorized as not being valuable to users based on a general acceptance that system log files are not associated with an amount of work invested by a user. Accordingly, a file type for an electronic file may be identified, and a defined file value of the electronic file may be determined based in part on a value (e.g., low, medium, or high) assigned to the file type.

Additional file properties may be used to determine a defined file value of an electronic file. For example, a file property that includes a name, such as an owner property, author property, last modified by property, or similar file properties that associate a name with an electronic file may be used to determine a defined file value of an electronic file. The file property may be analyzed to determine whether a name specified in a file property matches a user name associated with a user profile. For example, a file owner name may be obtained from a file owner property of an electronic file and the file owner name may be matched to a user name obtained from a user profile or a current user login. A name obtained from a file property that matches a user name or current user login may indicate that a user has invested some amount of work into the electronic file and that the electronic file is important to the user. Accordingly, a defined file value of the electronic file may be determined in part based on whether a file property includes a name that matches the name of a user or current user login.

Also, file properties indicating user interaction with an electronic file may be used to determine a defined file value of an electronic file. Examples of file properties that indicate user interaction with an electronic file may include file properties indicating a time that the electronic file was last accessed (e.g., created, opened, or modified), including a file created date property, last modified date property, last printed data property, or similar file properties, as well as file properties indicating an amount of time invested in an electronic file by a user, such as total editing time property. An electronic file that has been recently accessed (e.g., within a few days or weeks), or reports a significant amount of time used in editing an electronic file (e.g., more than an 15-30 minutes) may indicate that the electronic file may be more important to a user as compared to electronic files that have not been recently accessed. In one example, file properties indicating a time that an electronic file was accessed and/or an amount of time that has been invested in the electronic file may be analyzed, and a defined file value of the electronic file may be determined in part based on the analysis.

As another example, an activity history of user interaction with an electronic file may be recorded and the activity history may be used to determine a defined file value for an electronic file. For example, a file system on the client computer 102 may be monitored for file events indicating that a user has interacted with a particular electronic file. In response to detecting a file event associated with an electronic file, metadata for the electronic file may be queried and file properties of the electronic file may be analyzed to determine what type of user interaction may have occurred with the electronic file. For example, file properties which indicate user interaction with an electronic file, such as a file created date property, a last modified date property, a last printed data property, or similar file properties may be analyzed. In the case that a file property indicates a user interaction with the electronic file, the file event may be added to an activity history for the electronic file.

An activity history for an electronic file may be used to determine a defined file value of the electronic file. For example, an activity history may indicate an amount of user interaction that has occurred with an electronic file over a period of time. The amount of user interaction during a time period may indicate a value of the electronic file to the user. For example, an activity history showing that a user has modified an electronic file numerous times over a recent period of time may indicate that the electronic file may be important to the user. In one example, an activity history may be evaluated according to: an amount of user interaction with the electronic file, a frequency of user interaction with the electronic file, and/or an age of user interaction with the electronic file. The results of evaluating an activity history for an electronic file may be used in part to determine a defined file value of the electronic file. For example, an activity history indicating a low frequency of user interaction over a recent period may result in a low defined file value, whereas an activity history indicating a high frequency of user interaction over a recent time period may result in a high defined file value.

In one example, an amount of user interaction with a file directory may be used to determine in part a defined file value of one or more electronic files included in the file directory. User interaction with a file directory may indicate a value of electronic files included in the file directory to a user. For example, a user may establish a working or preferred file directory for electronic files that the user is currently working on. A working file directory may be identified by monitoring a file system on the client computer 102 for file events associated with the file directory. The file events may include creating an electronic file in the file directory, modifying an electronic file in the file directory, and/or copying an electronic file to the file directory. An activity history for a file directory may be constructed and the activity history may be used to identify the file directory as a working file directory or user preferred file directory. As part of determining a file value for an electronic file, a file directory containing the electronic file may be identified, and the defined file value of the electronic file may be determined based in part on whether the file directory is a working or preferred file directory. For example, a defined file value for an electronic file may be increased when a file directory containing the electronic file is a working or preferred file directory.

Thus, using the heuristics described above, the backup agent 106 may be configured to determine a defined file value for an electronic file. In one example, the backup agent 106 may assign a numerical value (e.g., score, weight, rank, etc.) to each file characteristic evaluated using a heuristic, and the backup agent 106 may calculate a defined file value using the values assigned to the file characteristics. For example, the backup agent 106 may assign values to a file type, a file directory, and/or an activity history and the values may be used to calculate (e.g., sum) a defined file value for the electronic file.

A defined file value calculated for an electronic file may be used as a priority indicator which may be used to assign a backup priority to a backup entry added to the backup queue 118. In one example, a defined file value may be one factor among a number of factors used to assign a backup priority to an electronic file. For example, a backup priority may be based on a defined file value as well as additional factors that may include: file size, date of last backup, available network bandwidth, time of day, and other factors associated with electronic file backups.

In one example, a backup priority may be used to sort the backup queue, which may determine an order in which electronic files represented by backup entries in the backup queue are copied and sent to the backup storage 104 via the network 110. For example, after adding a backup entry to the backup queue, a backup priority may be added (e.g., written) to the backup entry based on a defined file value calculated for an electronic file represented by the backup entry. In one example, the backup queue may be sorted after adding a backup entry to the backup queue using backup priorities assigned to backup entries contained in the backup queue 120. The backup queue may be re-sorted each time a new backup entry is added to the backup queue. In another example, the backup queue may be a priority queue and the backup queue may be queried for a backup entry that has the highest backup priority.

Backup entries may be retrieved from the backup queue and an electronic file associated with the backup entry may be identified. The electronic file may be replicated and a copy of the electronic file may be sent 122 to the server 108 for storage on the backup storage 104. Processing of the backup queue may be performed on a continuing basis or on-going basis. For example, adding backup entries to the backup queue may trigger processing of the backup entries according to an order of the backup entries in the backup queue. In other words, after adding a backup entry to the backup queue, an electronic file associated with the backup entry is backed up to the backup storage 104 as soon as possible based on the position of the backup entry in the backup queue and available network communication and processing resources. As an illustration, in response to adding one or more backup events to the backup queue, the backup agent 106 may sort the backup queue, determine available network bandwidth for sending an electronic file to the backup storage 104, retrieve a backup entry from the front of the backup queue and send a copy of an electronic file represented by the backup entry to the backup storage 104. In one example, a decision whether to process a backup entry in the backup queue may be based in part on network utilization of a network 110. For example, as described in greater detail later, processing of the backup queue may be temporarily suspended when the network 110 is experiencing high demand, and processing of the backup queue may resume once demand has returned to a predefined level.

Figure 2:
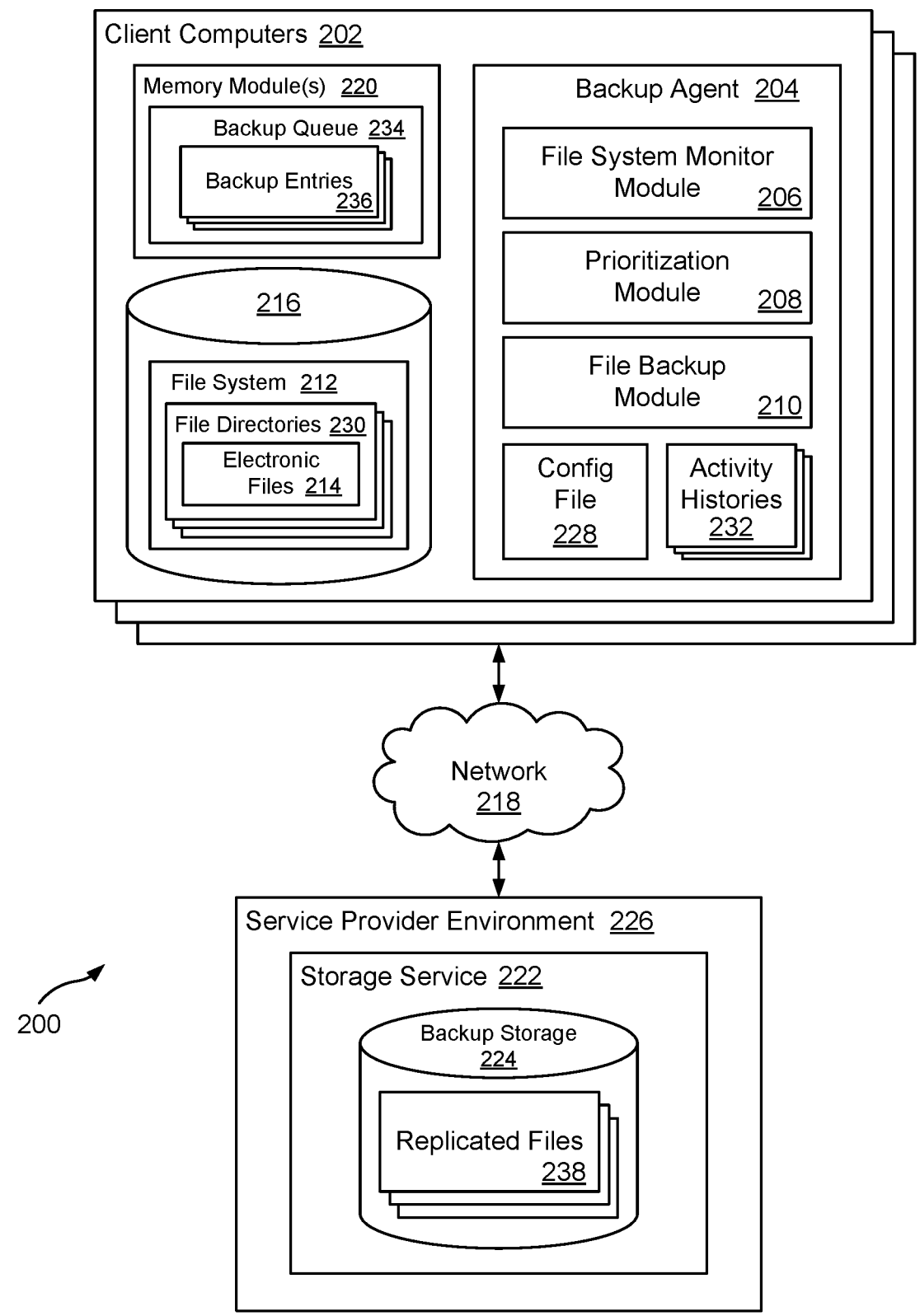
FIG. 2 is a block diagram that illustrates various example components included in a system for prioritizing electronic files according to a defined value of the electronic files to a user.

FIG. 2 illustrates components of an example system environment 200 on which the present technology may be executed. The system environment 200 may include client computers 202 in network communication with a service provider environment 226. The service provider environment 226 may include computing resources for executing managed computing services including managed storage services 222 which provide backup storage 224 for storing electronic files 214. A client computer 202 may include a backup agent 204, which may be an application, program, or script configured to prioritize electronic files 214 stored on the client computer 202 according to a defined file value and send copies of the electronic files 214 to the backup storage 224 managed by the storage service 222.

As illustrated, the backup agent 204 may include modules used to backup electronic files 214 stored on a client computer 202. In one example, the modules may include a file system monitor module 206, a prioritization module 208, and a file backup module 210. The file system monitor module 206 may be configured to monitor a file system 212 for file system change notifications and raise a backup entry when a file directory 230, or an electronic file 214 in a file directory 230, changes. Backup entries 236 for file events raised by the file system monitor module 206 may be added to a backup queue 234 for processing by the file backup module 210. A backup entry 236 may be a data object, a data record, or other data structure used to represent structured data. A backup entry 236 added to the backup queue 234 may include a file identifier and a file location for an electronic file 214 associated with a change detected by the file system monitor 206.

In one example, the file system monitor module 206 may be configured to add modification events to activity histories 232 for file directories 230 and electronic files 214. For example, the file system monitor module 206 may be used to monitor the file system 212 for file system change notifications associated with modification events linked to file directories 230 and electronic files 214 and record the modification events to activity histories 232 for the file directories 230 and the electronic files 214. For example, a change to an electronic file 214 may be recorded to an activity history 232 for the electronic file 214. An activity history 232 may include, but is not limited to, information for a modification and a date of the modification. The activity histories 232 for the file directories 230 and the electronic files 214 may be analyzed by the prioritization module 208 to determine a value of a file directory 230 or an electronic file 214 to a user.

The prioritization module 208 may be configured to assign a backup priority to backup entries 236 added to the backup queue 234. A backup priority assigned to a backup entry 236 may be determined using a defined file value calculated for an electronic file 214 linked to the backup entry 236. The prioritization module 208 may be configured to calculate a defined file value, as described in association with FIG. 1, and assign a backup priority to a backup entry 236 that corresponds to the defined file value. For example, the prioritization module 208 may be used to identify an electronic file 214 linked to a backup entry 236 added to the backup queue 234 and evaluate file characteristics, such as file properties for the electronic file 214 (e.g., a file type and other file properties), a file directory 230 containing the electronic file 214, and/or an activity history for the electronic file 214, and then the prioritization module may calculate a defined file value for the electronic file 214 based on the evaluation of the file characteristics.

In one example, weights assigned to certain file characteristics may be used to calculate a defined file value for the electronic file 214. The weights may represent a value of the file characteristics to a user. As an illustration, weights may be assigned to individual file types. For example, file types (e.g., word processing documents) associated with a user work product may be assigned higher weights as compared to weights assigned to other file types (e.g., system log files). The prioritization module 208 may be configured to obtain weights assigned to file properties from a configuration file 228. Also, the prioritization module 208 may be configured to assign weights to activity histories 232 for file directories 230 and electronic files 214 based on an amount of recorded user interaction with the file directories 230 and the electronic files 214 and an age of the user interaction with the file directories 230 and the electronic files 214. For example, the prioritization module 208 may be used to evaluate an activity history 232 to determine an amount of user interaction, a frequency of user interaction, and a time of user interaction with an electronic file 214 or file directory 230, and assign a weight to the activity history 232 according to the amount of user interaction, frequency of user interaction, and time of user interaction with the electronic file 214 or file directory 230.

The prioritization module 208 may be configured to assign a backup priority, which corresponds to a defined file value calculated for an electronic file 214, to a backup entry 236 in the backup queue 234. In one example, a backup priority assigned to a backup entry 236 may be added to the backup entry 236. For example, the backup priority may be added to the information (e.g., a file identifier and a file location) already included in the backup entry 236. In one example, after assigning a backup priority to a backup entry 236 included in the backup queue 234, the prioritization module 208 may cause (e.g., issue a sort command) the backup queue 234 to be sorted according to the backup priorities assigned to the backup entries 236 included in the backup queue 234.

The file backup module 210 may be configured to process the backup queue 234 by retrieving a backup entry 236 from the backup queue 234 and obtain information for an electronic file 214 from the backup entry 236. For example, the file backup module 210 may be configured to obtain a file path from a backup entry 236 and cause an electronic file 214 associated with the file path to be replicated and sent to a storage service 222 for storage to a backup storage 224. In one example, versions of electronic files 214 replicated (replicated files 238) and sent to the backup storage 224 may be created on the backup storage 224. For example, versions of replicated files 238 may be created and stored on the backup storage 224 using, for example, modification time versioning, hash-based versioning, Git versioning, and other versioning techniques.

In one example, the file backup module 210 may be configured to monitor network utilization of a network 218 used to send electronic files 214 to the backup storage 224. During times that network utilization may be higher than a determined threshold (e.g., between 80-100% utilization), the file backup module 210 may be configured to temporarily suspend processing of the backup queue 234 and wait until network utilization returns to an acceptable level (e.g., between 0-80% utilization). As an illustration, the file backup module 210 may obtain a geographic location of a client computer 202, which may be used to identify a point of egress from the client computer's local network out to the network 218 (e.g., the Internet). The file backup module 210 may obtain network utilization information for the point of egress from a network utilization service (not shown) by making an API (Application Programming Interface) request to the network utilization service. During times that network utilization may be higher than the determined threshold or higher than an expected use (e.g., higher than average), processing of the backup queue 234 may be suspended and the file backup module 210 may periodically request network utilization information for the point of egress from the network utilization service until network utilization has returned to an acceptable level.

In one example, a backup priority assigned to a backup entry 236 may override a suspension of processing the backup queue 234. For example, the file backup module 210 may be configured to evaluate a backup priority assigned to a backup entry 236 to determine whether the backup priority overrides a processing suspension of processing of the backup queue 234. In the case that the backup priority assigned to the backup entry 236 is determined to override processing suspension of the backup queue 234, the file backup module 210 may process the backup entry 236, and again temporally suspend processing on other backup entries 236 in the backup queue 234 until network utilization returns to an acceptable level.

A client computer 202 may include any computing device capable of sending and receiving data over a network 218. A client computer 202 may comprise, for example a processor-based system and may be a device such as, but not limited to, a desktop computer, laptop or notebook computer, tablet computer, mainframe computer system, handheld computer, workstation, network computer, or other devices with like capability.

The various processes and/or other functionality contained within the system environment 200 may be executed on one or more processors that are in communication with one or more memory modules 220. A file system 212 may include data structures which an operating system may use to manage organization of electronic files 214 on a data store 216. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or nonvolatile RAM, optical media, or hard-drive type media. The data store may be representative of a plurality of data stores as can be appreciated.

API calls, procedure calls or other network commands that may be made in relation to the modules and services included in the service provider environment 226 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 218 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Figure 3:
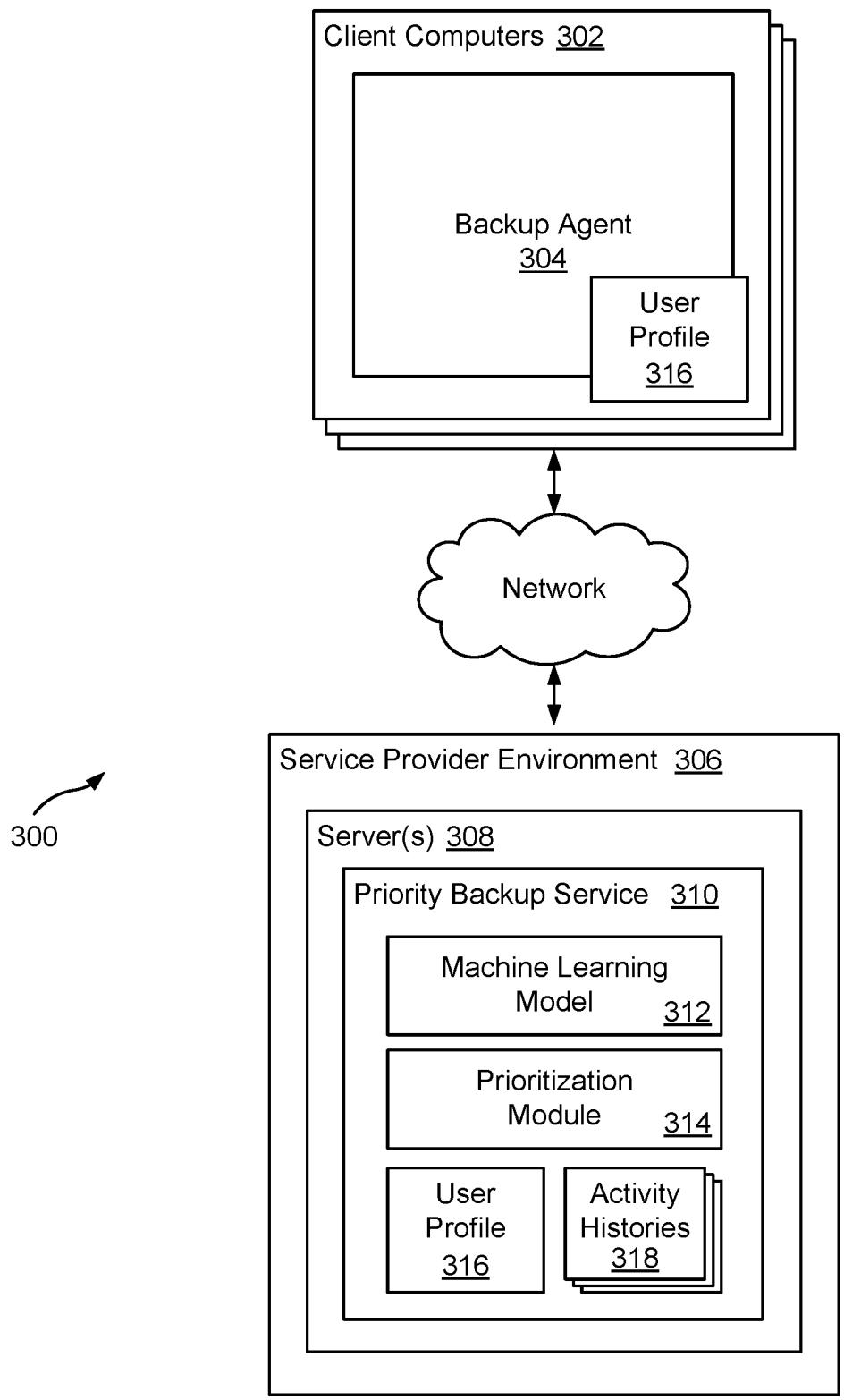
FIG. 3 is a block diagram that illustrates an example system for creating a user profile specifying file directories and electronic files determined to be important to a user.

FIG. 3 illustrates components of an example system 300 that may be used to determine file directories and electronic files that may be important to an individual user and to create a user profile 316 specifying file directories, electronic files, and/or file characteristics identified as being important to the user. The system 300 may include a service provider environment 306 that includes servers 308 configured to host various services. The service provider environment 306 may include computing resources for executing services using computing instances (e.g., virtual machines), which may be an instance of a software implementation of a machine (i.e. a computer) configured to emulate a physical machine, as described in more detail in association with FIG. 7.

As illustrated, one or more servers 308 may host a priority backup service 310. The priority backup service 310 may be configured to evaluate activity history 318 for file directories and electronic files stored on a client computer 302 and identify file directories and/or electronic files that may be important to a user of the client computer 302 based on the activity history 318 obtained from the backup agent 304. A backup agent 304 on a client computer 302 may be configured to monitor a state of a file system to detect file system activity associated with file directories and electronic files managed using the file system. The backup agent 304 may collect file system activity information associated with file directories and electronic files in activity histories 318 and provide the activity histories 318 to the priority backup service 310.

The priority backup service 310 may be configured to analyze an activity history 318 provided by a backup agent 304 to determine an amount of user interaction with a file directory or an electronic file, which may indicate a value of the file directory or electronic file to a user. In one example, a machine learning model 312 may be used to analyze an activity history 318. For example, a feature vector may be generated using activity history data and the feature vector may be input to the machine learning model 312. The machine learning model 312 may be configured to classify file directories, electronic files, and/or file characteristics (e.g., a file type) based on an activity history. A user profile 316 may be created for a user based on the results of analyzing a user's activity histories 318. The user profile 316 may specify electronic files, file types, and/or file directories determined to be important to the user, and the user profile 316 may be used to determine a defined file value for an electronic file.

In one example, the priority backup service 310 may be used to create a user profile 316 for use on a client computer 302. For example, the user profile 316 may be provided to a backup agent 304 on the client computer 302 and the backup agent 304 may be configured to use the user profile 316 to determine a defined file value for an electronic file stored on the client computer 302. The priority backup service 310 may be configured to periodically update the user profile 316 using activity history 318 obtained from the backup agent 304.

In another example, the priority backup service 310 may be configured to receive a request for a backup priority for an electronic file stored on a client computer 302 from a backup agent 304. A request from a backup agent 304 requesting a backup priority may include information for an electronic file associated with a file event detected by the backup agent 304. The priority backup service 310 may identify a user profile 316 associated with a user of a client computer 302 and use specifications included in the user profile 316 to determine the backup priority for the electronic file. As illustrated, the priority backup service 310 may: include a prioritization module 314 configured to calculate a defined file value for an electronic file using specifications obtained from a user profile 316, assign a backup priority to the electronic file that corresponds to the defined file value, and return the backup priority to a backup agent 304 that requested the backup priority. The backup agent 304 may then use the backup priority to determine an order in which electronic files stored on the client computer 302 are stored to a backup storage, as described earlier. While FIGS. 1-3 illustrate examples of system environments that may implement the techniques above, many other similar or different system environments are possible. The example system environments discussed and illustrated above are merely representative and not limiting.

Figure 4:
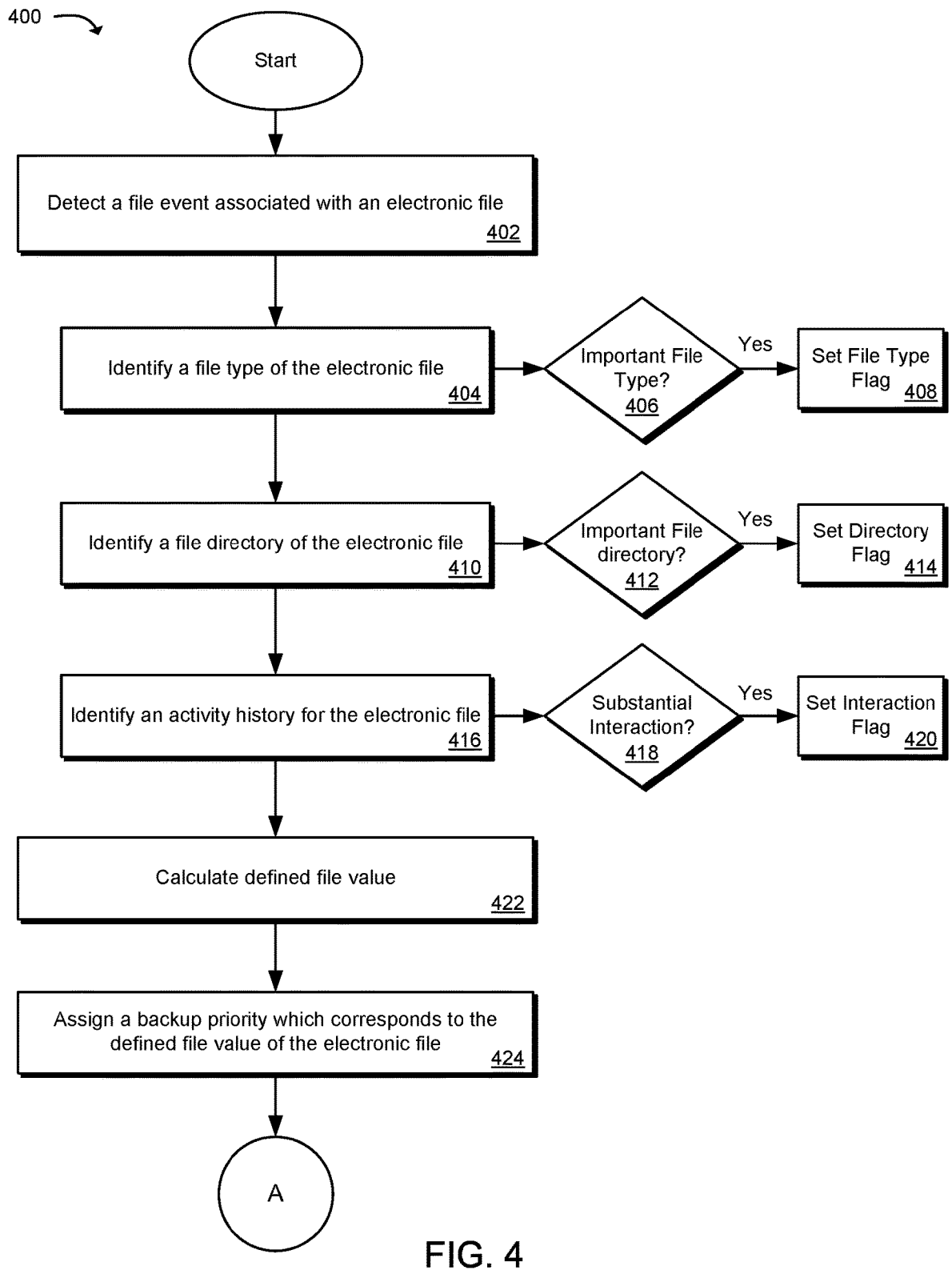
FIG. 4 is a flow diagram illustrating an example method for assigning a backup priority to an electronic file.

Moving now to FIG. 4, a flow diagram illustrates an example method 400 for assigning a backup priority to an electronic file. As in block 402, a file event associated with an electronic file may be detected. For example, a file event may include adding an electronic file to a file system or changing an electronic file managed using the file system. A file event may be detected by monitoring a file system for events associated with creating and modifying electronic files. In detecting the file event, the electronic file associated with the file event may be identified and file metadata for the electronic file may be obtained from the file system.

As in block 404, a file type of the electronic file may be identified. For example, the file type of the electronic file may be obtained from the file metadata. As in block 406, the file type of the electronic file may be evaluated to determine whether the file type may be categorized as important. A file type may be categorized as important based in part on whether the file type is associated with a user work product. For example, word processing documents, spreadsheet documents, presentation documents, source code files, and other types of electronic files associated with a user work product may be categorized as being important because of an amount of work that a user may have invested into the electronic files. In one example, a user may specify which file types are important to the user. In the case that the file type of the electronic file is identified as being important, then as in block 408, a file type flag may be set, which may be used to calculate a defined file value for the electronic file.

As in block 410, a file directory for the electronic file may be identified. For example, the file directory containing the electronic file may be obtained from the file metadata. As in block 412, the file directory may be evaluated to determine whether the file directory may be categorized as important to a user. A file directory may be categorized as important to a user based in part on whether the file directory is used to store important files and/or whether a user frequently accesses the file directory. For example, a user may store electronic files that the user is working on in a working file directory. The user may access the file directory in order to access electronic files that the user is currently working on. Accordingly, a file system may be monitored to determine which file directories a user frequently accesses and the file directories may be categorized as important. In one example, a user may specify which file directories are important to the user. In the case that the file directory containing the electronic file is categorized as important, as in block 414, a directory flag may be set. The directory flag, along with the file type flag, may be used to calculate the defined file value for the electronic file.

As in block 416, an activity history for the electronic file may be identified. The activity history may include information associated with an amount of user interaction that has occurred with the electronic file. As in block 418, the activity history of the electronic file may be evaluated to determine whether an amount of user interaction with the electronic file may be substantial (e.g., daily, multiple times a week, multiple times a month, etc.). For example, the activity history may be evaluated to determine an amount of user interaction that has occurred over the last day, week, month, or more. The amount of user interaction may be categorized as substantial based in part on the frequency of user interaction with the electronic file, and/or how recently the user interaction with the electronic file occurred. As a non-limiting example, user interaction occurring several times a day over the past few working days may indicate that the electronic file is important to a user. In the case that the activity history for the electronic file indicates that the electronic file is important to the user, then as in block 420, an interaction flag may be set.

The interaction flag, along with the file type flag and the directory flag, may be used to calculate the defined file value for the electronic file. In one example, each flag for an electronic file may represent a binary value and the values of the flags may be summed to form a defined file value. As an illustration, set flags may represent a binary value of one and unset flags represent a binary value zero. Accordingly, a defined file value may be calculated by summing the number of set flags. As another illustration, each flag may be assigned a score, rank, or weight and the scores, ranks, or weights of the set flags may be combined to form a defined file value. As a non-limiting example, each of the flags may be assigned a weight between one and ten, where a file type flag may be assigned a weight of two, a directory flag may be assigned a weight of one, and an interaction flag may be assigned a weight of five. The weight of the set flags may be summed to form a defined file value and the defined value may be used to determine the backup priority. As will be appreciated, other methods may be used to assign values to file characteristics used to determine a value of an electronic file to a user, and these methods are also within the scope of this disclosure.

As in block 422, a defined file value may be calculated and, as in block 424, a backup priority that corresponds to the defined file value may be assigned to the electronic file. More specifically, as described earlier, the backup priority may be assigned to a backup entry added to a backup queue. In one example, the defined file value may be calculated by determining which flags (i.e., the file type flag, directory flag, and interaction flag) are set and summing the number of flags that are set. For example, in the case that each flag is set (e.g., three flags), the value of the defined file value is the sum of the flags (e.g., three). A backup priority may then be assigned to the electronic file that corresponds to the defined file value (e.g., three). Alternatively, a weighting for each flag may be provided and used in a calculation of the backup priority (e.g. a weighted summation or multiplying the weights, etc.).

Figure 5:
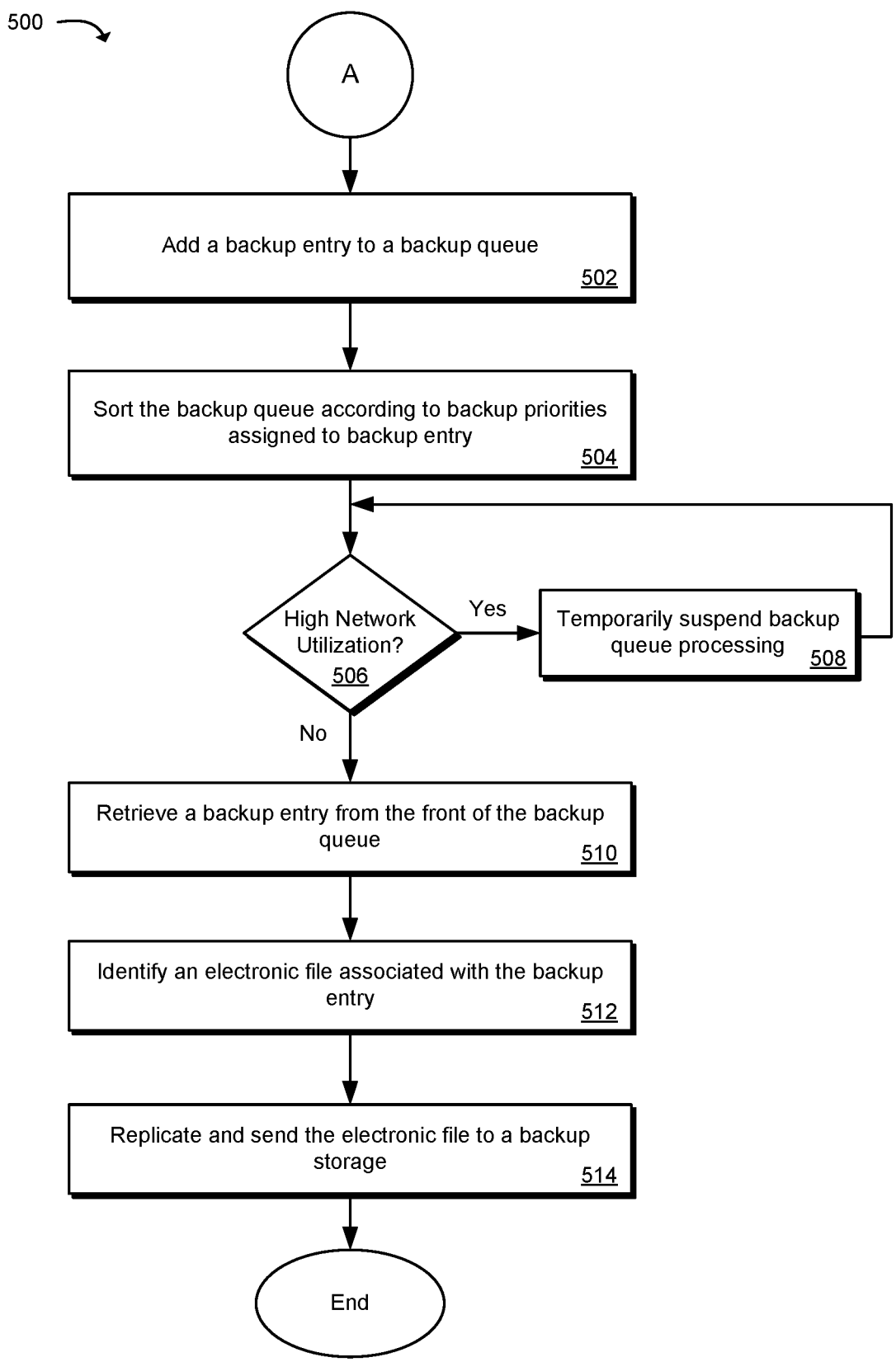
FIG. 5 is a flow diagram that illustrates an example method for processing a backup queue.

FIG. 5 is a flow diagram that illustrates an example method 500 for processing a backup queue. As also described above in association with FIG. 4, a file system may be monitored for file events. In response to detecting a file event, a backup entry may be added to a backup queue 502. In one example, the backup entry may include a file identifier, a file location, and a backup priority for an electronic file associated with the file event.

After adding the backup entry to the backup queue, as in block 504, the backup queue may be sorted according to the backup priorities of the backup entries included in the backup queue. The backup queue may be re-sorted each time a new backup entry is added to the backup queue. As an illustration, backup entries may be retrieved from the front of the backup queue and processed, such that an electronic file associated with a backup entry retrieved from the backup queue may be replicated and sent to a backup storage. In the event that a backup entry with a higher backup priority as compared to other backup entries included in the backup queue is added to the backup queue, then the backup queue may be re-sorted and the backup entry having the higher backup priority may be moved to the front of the backup queue.

Prior to retrieving a backup entry for processing from the backup queue, as in block 506, network utilization for a network used to send a copy of the electronic file to a backup storage may be evaluated to determine whether sufficient network bandwidth is available to send the copy of the electronic file to the backup storage without negatively impacting the network. In the case that network utilization is high, such that limited network bandwidth may be available to send a copy of the electronic file, then as in block 508, processing of the backup queue may be temporarily suspended. For example, processing may be suspended until network utilization returns to an acceptable level (e.g., 50%, 65%, 80%, etc.).

In one example, a backup priority assigned to an electronic file may override a temporary suspension of processing the backup queue. For example, an electronic file may be categorized as "critical" or "high value", such that safekeeping of the electronic file may override an effort to not overburden a network used to send the electronic file to a backup storage. Thus, backup entries having a backup priority that overrides a temporary suspension of processing may be sorted to the front of the backup queue and the backup entry may be processed. Thereafter, temporary suspension of processing may resume until network utilization returns to an acceptable level.

In the case that network utilization is not high, then as in block 510, a backup entry may be retrieved from the front of the backup queue for processing. As in block 512, an electronic file associated with the backup entry may be identified. For example, the backup entry may include an identifier and a file location (e.g., a directory path or some other location identifier) for the electronic file. As in block 514, the electronic file may be replicated and sent to a backup storage. For example, using a file location obtained from the backup entry, the electronic file may be retrieved and copied, and the copy of the electronic file may be sent to the backup storage, which may include a managed storage service (e.g., "cloud" storage service).

Figure 6:
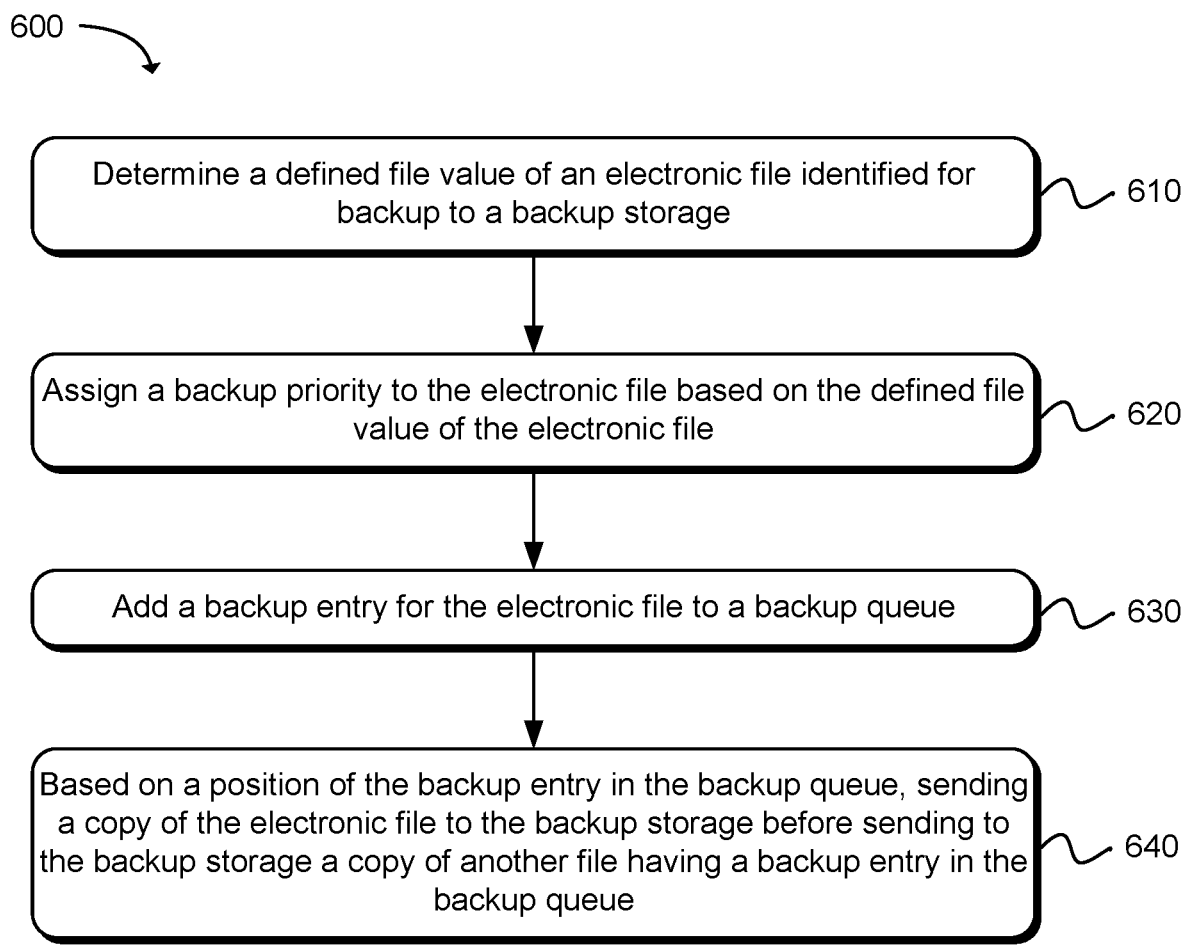
FIG. 6 is a block diagram illustrating an example method for prioritizing electronic files for backup to a backup storage.

FIG. 6 is a flow diagram illustrating an example method 600 for prioritizing electronic files for backup to a backup storage. As in block 610, a defined file value of an electronic file identified for backup to a backup storage may be identified. For example, a file system watcher may be configured to monitor a file system for a file event indicating that the electronic file has been created, modified, appended, re-written, etc. In response to detecting the file event, the file system watcher may raise a backup event and the electronic file may be identified for backup to the backup storage.

In one example, the defined file value of the electronic file may be determined using at least one of: a file type, a file directory, and/or a file activity history associated with the electronic file, where the file type, file directory, and/or file activity history may indicate a value of the electronic file to a user. A file activity history for the electronic file may be collected by monitoring a file system for modification events linked to the electronic file and recording the modification events in the file activity history. The file activity history may be analyzed to determine an amount of user interaction with the electronic file and an age of the user interaction with the electronic file. In one example, a weight may be assigned to the activity history according to the amount of user interaction with the electronic file and the age of the user interaction with the electronic file, and the weight may be used to calculate the defined file value.

In one example, a file system may be monitored to determine a user's working file directories (e.g., file directories used to organize the user's important files). The file system may be monitored for an amount of user interaction with electronic files in a file directory and an age of the user interaction with the electronic files in the file directory. Frequent interaction with a file directory may indicate that the file directory may be a user's working directory. In one example, a weight may be assigned to file directories according to an amount of user interaction with the file directory and the age of the user interaction with the file directory.

As in block 620, a backup priority for the electronic file may be assigned based in part on the defined file value of the electronic file. For example, the backup priority may correspond to the defined file value. As in block 630, a backup entry for the electronic file may be added to a backup queue. In one example, a backup entry that includes electronic file information and a backup priority of the electronic file may be added to the backup queue. In one example, the backup priority queue may be sorted using the backup priorities of electronic files represented in the backup queue. The backup queue may be re-sorted whenever a new backup entry is added to the backup queue. As in block 640, based on a position (e.g., a priority) of the backup entry in the backup queue, a copy of the electronic file may be sent to the backup storage before sending a copy of another file (e.g., another file with a comparatively lower backup priority) to the backup storage that has a backup entry in the backup queue.

Figure 7:
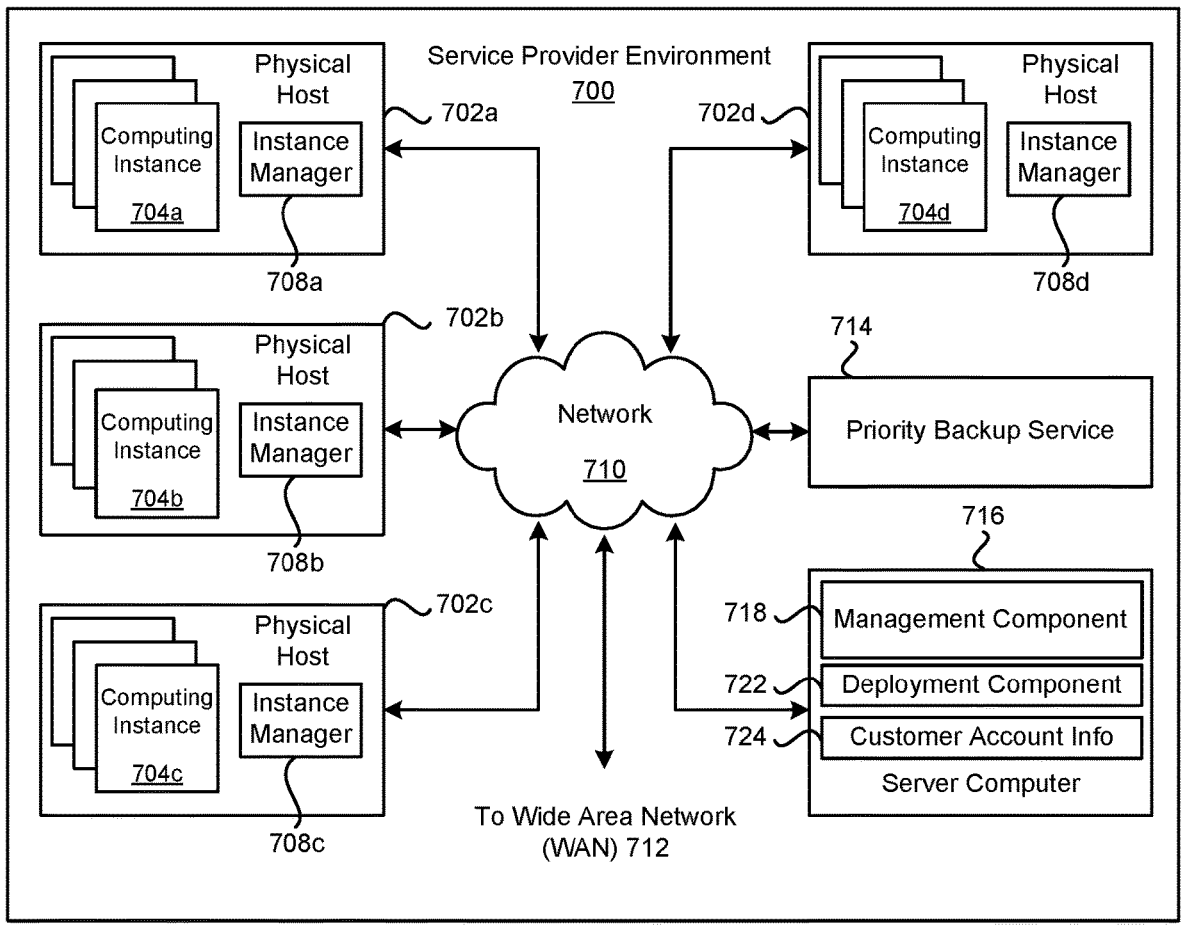
FIG. 7 is a block diagram that illustrates an example service provider environment that includes a backup priority service.

FIG. 7 is a block diagram illustrating an example computing service 700 that may be used to execute and manage a number of computing instances 704a-d. In particular, the computing service 700 depicted illustrates one environment in which the technology described herein may be used. The computing service 700 may be one type of environment that includes various virtualized service resources that may be used, for instance, to host computing instances 704a-d.

The computing service 700 may be capable of delivery of computing, storage and networking capacity as a software service to a community of end recipients. In one example, the computing service 700 may be established for an organization by or on behalf of the organization. That is, the computing service 700 may offer a "private cloud environment." In another example, the computing service 700 may support a multi-tenant environment, wherein a plurality of customers may operate independently (i.e., a public cloud environment). Generally speaking, the computing service 700 may provide the following models: Infrastructure as a Service ("IaaS"), Platform as a Service ("PaaS"), and/or Software as a Service ("SaaS"). Other models may be provided. For the IaaS model, the computing service 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 700. End customers may access the computing service 700 using networked client devices, such as desktop computers, laptops, tablets, smartphones, etc. running web browsers or other lightweight client applications, for example. Those familiar with the art will recognize that the computing service 700 may be described as a "cloud" environment.

The particularly illustrated computing service 700 may include a plurality of server computers 702a-d. While four server computers are shown, any number may be used, and large data centers may include thousands of server computers. The computing service 700 may provide computing resources for executing computing instances 704a-d. Computing instances 704a-d may, for example, be virtual machines. A virtual machine may be an instance of a software implementation of a machine (i.e. a computer) that executes applications like a physical machine. In the example of a virtual machine, each of the server computers 702a-d may be configured to execute an instance manager 708*a-d* capable of executing the instances. The instance manager 708*a-d* may be a hypervisor, virtual machine monitor (VMM), or another type of program configured to enable the execution of multiple computing instances 704*a-d* on a single server. Additionally, each of the computing instances 704*a-d* may be configured to execute one or more applications.

One or more server computers 714 and 716 may be reserved to execute software components for managing the operation of the computing service 700 and the computing instances 704*a-d*. For example, a server computer 714 may execute a priority backup service that may perform functions described earlier, including evaluating an activity history for file directories and electronic files stored on a client computer and identifying file directories and/or electronic files that may be important to a user of the client computer based on the activity history.

A server computer 716 may execute a management component 718. A customer may access the management component 718 to configure various aspects of the operation of the computing instances 704*a-d* purchased by a customer. For example, the customer may setup computing instances 704*a-d* and make changes to the configuration of the computing instances 704*a-d*.

A deployment component 722 may be used to assist customers in the deployment of computing instances 704*a-d*. The deployment component 722 may have access to account information associated with the computing instances 704*a-d*, such as the name of an owner of the account, credit card information, country of the owner, etc. The deployment component 722 may receive a configuration from a customer that includes data describing how computing instances 704*a-d* may be configured. For example, the configuration may include an operating system, provide one or more applications to be installed in computing instances 704*a-d*, provide scripts and/or other types of code to be executed for configuring computing instances 704*a-d*, provide cache logic specifying how an application cache should be prepared, and other types of information. The deployment component 722 may utilize the customer-provided configuration and cache logic to configure, prime, and launch computing instances 704*a-d*. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the computing service 700 and the server computers 702*a-d*, 716. The network 710 may be a local area network (LAN) and may be connected to a Wide Area Network (WAN) 712 or the Internet, so that end customers may access the computing service 700. The network topology illustrated in FIG. 7 has been simplified, many more networks and networking devices may be utilized to interconnect the various computing systems disclosed herein.

Figure 8:
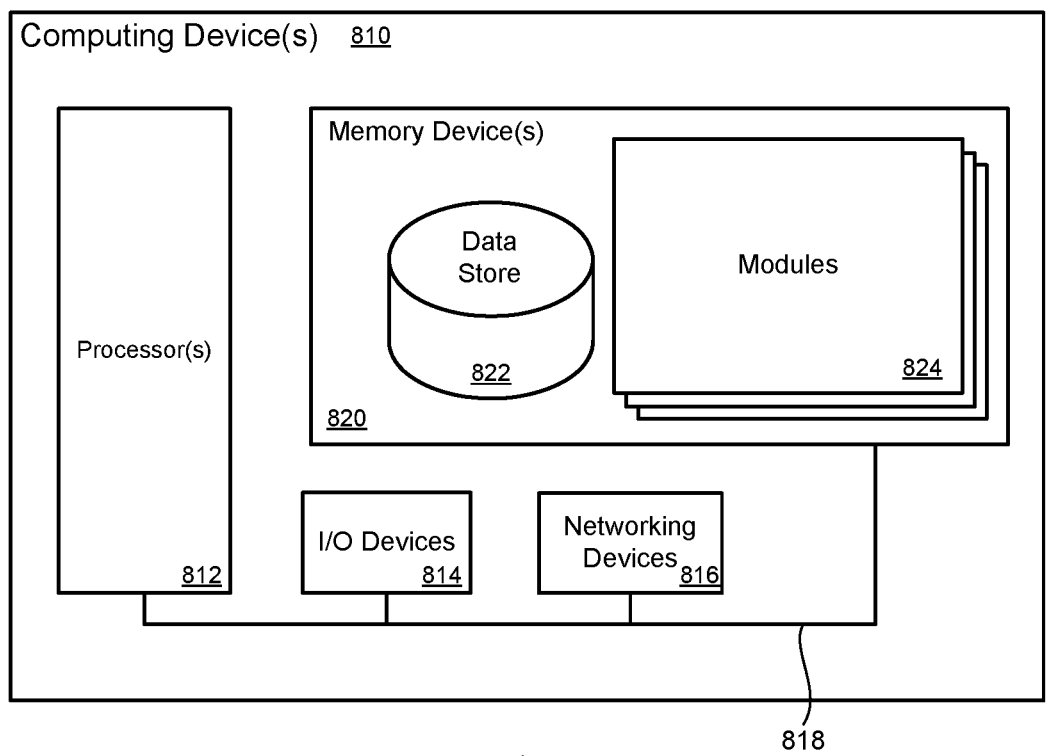
FIG. 8 is block diagram illustrating an example of a computing device that may be used to execute a method for prioritizing electronic files for backup to a backup storage.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. In one example, the memory device 820 may include a file system monitor module, a prioritization module, a file backup module, and other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high-level programming languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
    a data store containing electronic files managed using a file system;
    at least one processor;
    a memory device including instructions that, when executed by the at least one processor, cause the system to:
    determine that a file directory is a working file directory when an activity history for the file directory indicates that the file directory contains files that have been accessed at least once within a last defined time period, wherein the file directory is managed using the file system;
    detect a file event associated with creating or modifying an electronic file included in the working file directory;
    determine a defined file value of the electronic file based in part on the electronic file being included in the working file directory;
    determine a backup priority for the electronic file based on the defined file value of the electronic file;
    add a backup entry to a backup queue, wherein the backup entry represents the electronic file and the backup entry includes a file identifier for the electronic file, a location of the electronic file, and the backup priority assigned to the electronic file;
    sort the backup queue using backup priorities included in backup entries in the backup queue; and
    send copies of the electronic files represented in the backup queue to a backup storage according to an order of the backup entries in the backup queue.

2. A system as in claim 1, wherein a file type of the electronic file is evaluated by associating the file type with a defined amount of work value invested in the electronic files having the file type.

3. A system as in claim 1, wherein the activity history for the file directory is evaluated according to an amount of user interaction with the electronic files included in the file directory.

4. A system as in claim 1, wherein the activity history for the file directory is evaluated according to: an amount of user interaction with the electronic file, a frequency of user interaction with the electronic file, or an age of user interaction with the electronic file.

5. A computer implemented method, comprising:
determining that a file directory is a working file directory when an activity history for the file directory indicates that the file directory contains files that have been accessed at least once within a last defined time period, using one or more processors;
determining a defined file value of an electronic file based in part on the electronic file being included in the working file directory, using the one or more processors;
assigning a backup priority to the electronic file based on the defined file value of the electronic file, using the one or more processors;
adding a backup entry for the electronic file to a backup queue, using the one or more processors; and
based on a position of the backup entry in the backup queue, sending a copy of the electronic file to a backup storage before sending to the backup storage a copy of another file having a backup entry in the backup queue, using the one or more processors.

6. A method as in claim 5, wherein determining that the file directory is the working file directory further comprises increasing defined file values of electronic files included in the file directory.

7. A method as in claim 5, further comprising:
monitoring a file system for file events linked to electronic files managed by the file system; and
recording the file events in the activity history used to identify the file directory as the working file directory.

8. A method as in claim 5, wherein determining that the file directory is the working file directory further comprises:
analyzing the activity history for the file directory to determine an amount of user interaction with the electronic file and an age of the user interaction with the electronic file; and
assigning a weight to the file directory according to the amount of user interaction with the electronic file and the age of the user interaction with the electronic file.

9. A method as in claim 5, wherein determining that the file directory is the working file directory further comprises:
analyzing a state of a file system for the file directory included in the file system to determine an amount of user interaction with electronic files in the file directory and an age of the user interaction with the electronic files in the file directory; and
assigning a weight to the file directory according to the amount of user interaction with the file directory and the age of the user interaction with the file directory.

10. A method as in claim 5, further comprising:
collecting activity history data for a file system used to manage electronic files stored on a client; and
analyzing the activity history data using machine learning to identify the file directory as the working file directory.

11. A method as in claim 5, further comprising creating a user profile to indicate that the file directory is the working file directory.

12. A method as in claim 5, further comprising:
receiving priority specifications for electronic files, file types, or file directories; and
calculating the backup priority for the electronic file using the priority specifications as provided.

13. A method as in claim 5, further comprising:
determining that network utilization of a network used to send the electronic file to the backup storage is high; and
temporarily suspending processing of the backup queue when network utilization is high.

14. A method as in claim 13, further comprising overriding suspension of processing the backup queue based on the backup priority assigned to the electronic file.

15. A method as in claim 5, wherein sending a copy of the electronic file further comprises sending the electronic file to a managed storage service in a service provider environment.

16. A method as in claim 5, wherein sending a copy of the electronic file further comprises creating file versions of the electronic file on the backup storage.

17. A non-transitory machine readable storage medium having instructions embodied thereon, the instructions when executed by a processor:
determine that a file directory is a working file directory when an activity history for the file directory indicates that the file directory contains files that have been accessed at least once within a last defined time period, wherein the file directory is managed by a file system on a client;
receive at a service provider environment an indication of a file event related to creating or modifying an electronic file included in the working file directory;
identify the electronic file for backup to a backup storage;
determine a defined file value of the electronic file based in part on the electronic file being included in the working file directory;
calculate a backup priority for the file identified for backup, wherein the backup priority is based on the defined file value of the electronic file and the backup priority indicates an order in which electronic files are sent to the backup storage;
add a backup entry for the electronic file to a backup queue, wherein the backup entry indicates the backup priority for the file and the backup queue is sorted using the backup priority; and
based on a position of the backup entry in the backup queue, initiate sending of a copy of the electronic file to the backup storage before sending to the backup storage a copy of another file having a backup entry in the backup queue.

18. A non-transitory machine readable storage medium as in claim 17, wherein the defined file value of the electronic file is increased based on the electronic file being included in the file directory identified as the working file directory.

19. A non-transitory machine readable storage medium as in claim 17, wherein the instructions that when executed by the processor further receive activity history data for the electronic file from the client, wherein the activity history is collected in the service provider environment and the activity history is evaluated to determine an amount of user interaction with the electronic files included in the file directory.

20. A non-transitory machine readable storage medium as in claim 17, wherein the instructions that when executed by the processor further obtain weights assigned to file properties of the electronic file from a data store located in the service provider environment, wherein the weights determine in part the defined file value of the electronic file.

* * * * *